(12) United States Patent
Banjo

(10) Patent No.: US 9,743,582 B2
(45) Date of Patent: Aug. 29, 2017

(54) INTEGRATED STRING AND BLADE TRIMMER SYSTEM

(71) Applicant: Frictionless World LLC, Louisville, CO (US)

(72) Inventor: Daniel Banjo, Boulder, CO (US)

(73) Assignee: Frictionless World LLC, Westminster, CO (US)

(*) Notice: Subject to any disclaimer, the term of this patent is extended or adjusted under 35 U.S.C. 154(b) by 73 days.

(21) Appl. No.: 14/519,245

(22) Filed: Oct. 21, 2014

(65) Prior Publication Data

US 2015/0107118 A1   Apr. 23, 2015

Related U.S. Application Data

(60) Provisional application No. 61/893,665, filed on Oct. 21, 2013.

(51) Int. Cl.
| | | |
|---|---|---|
| *A01D 34/00* | (2006.01) | |
| *A01D 34/416* | (2006.01) | |
| *A01D 34/73* | (2006.01) | |

(52) U.S. Cl.
CPC ..... *A01D 34/4166* (2013.01); *A01D 34/4168* (2013.01); *A01D 34/73* (2013.01); *A01D 34/736* (2013.01); *Y10T 29/49716* (2015.01); *Y10T 83/00* (2015.04)

(58) Field of Classification Search
CPC ............ A01D 34/4166; A01D 34/4168; A01D 34/68; A01D 34/73; A01D 34/733; A01D 34/736; A01D 34/412
USPC .................................... 30/276, 347; 56/12.7
See application file for complete search history.

(56) References Cited

U.S. PATENT DOCUMENTS

| | | | | | |
|---|---|---|---|---|---|
| 5,430,943 | A | * | 7/1995 | Lee ..................... | A01D 34/4168 30/276 |
| 5,491,962 | A | * | 2/1996 | Sutliff ................. | A01D 34/736 56/12.7 |
| 5,852,876 | A | * | 12/1998 | Wang ................... | A01D 34/733 30/276 |
| 6,363,616 | B1 | | 4/2002 | Kreissle | |

(Continued)

FOREIGN PATENT DOCUMENTS

| | | |
|---|---|---|
| CN | 2530433 Y | 1/2003 |
| CN | 202979669 U | 6/2013 |

(Continued)

*Primary Examiner* — Andrea Wellington
*Assistant Examiner* — Samuel A Davies
(74) *Attorney, Agent, or Firm* — Marsch Fischmann & Breyfogle LLP; Jonathon A. Szumny; Jeremy J. Neilson

(57) ABSTRACT

An integrated string and trimmer blade system that allows a user to simultaneously employ one or more flexible lines and one or more blades during various types of cutting operations (e.g., grass, weeds, branches, etc.). The system may be implemented on any appropriate cutting apparatus such as walk-behind trimmers and/or mowers, hand-held trimmers, and the like. Broadly, the system includes a cutting member having a body that is rotatable about a pivot axis of the cutting apparatus. One or more cutting blades are pivotally attached to the body such that the blades can oscillate or otherwise pivot relative to the body as the body rotates about the central axis. At least one of the blades includes one or more line holders thereon for receipt and attachment of one or more flexible cutting lines or strings.

20 Claims, 3 Drawing Sheets

(56) References Cited

U.S. PATENT DOCUMENTS

| | | | |
|---|---|---|---|
| 7,603,782 B2 * | 10/2009 | Jerez | A01D 34/416 30/276 |
| 7,743,511 B2 | 6/2010 | Jerez | |
| 2012/0066915 A1 * | 3/2012 | Alliss | A01D 34/4166 30/347 |
| 2012/0260508 A1 * | 10/2012 | Duvall | A01D 34/4166 30/347 |
| 2014/0202009 A1 * | 7/2014 | Proulx | A01D 34/4166 30/333 |

FOREIGN PATENT DOCUMENTS

| | | |
|---|---|---|
| CN | 203040191 U | 7/2013 |
| EP | 1110441 A1 | 6/2001 |
| EP | 1101396 B1 | 10/2005 |
| JP | 62175827 U | 11/1987 |
| JP | 11235113 A | 8/1999 |
| KR | 20120094617 A | 8/2012 |

\* cited by examiner

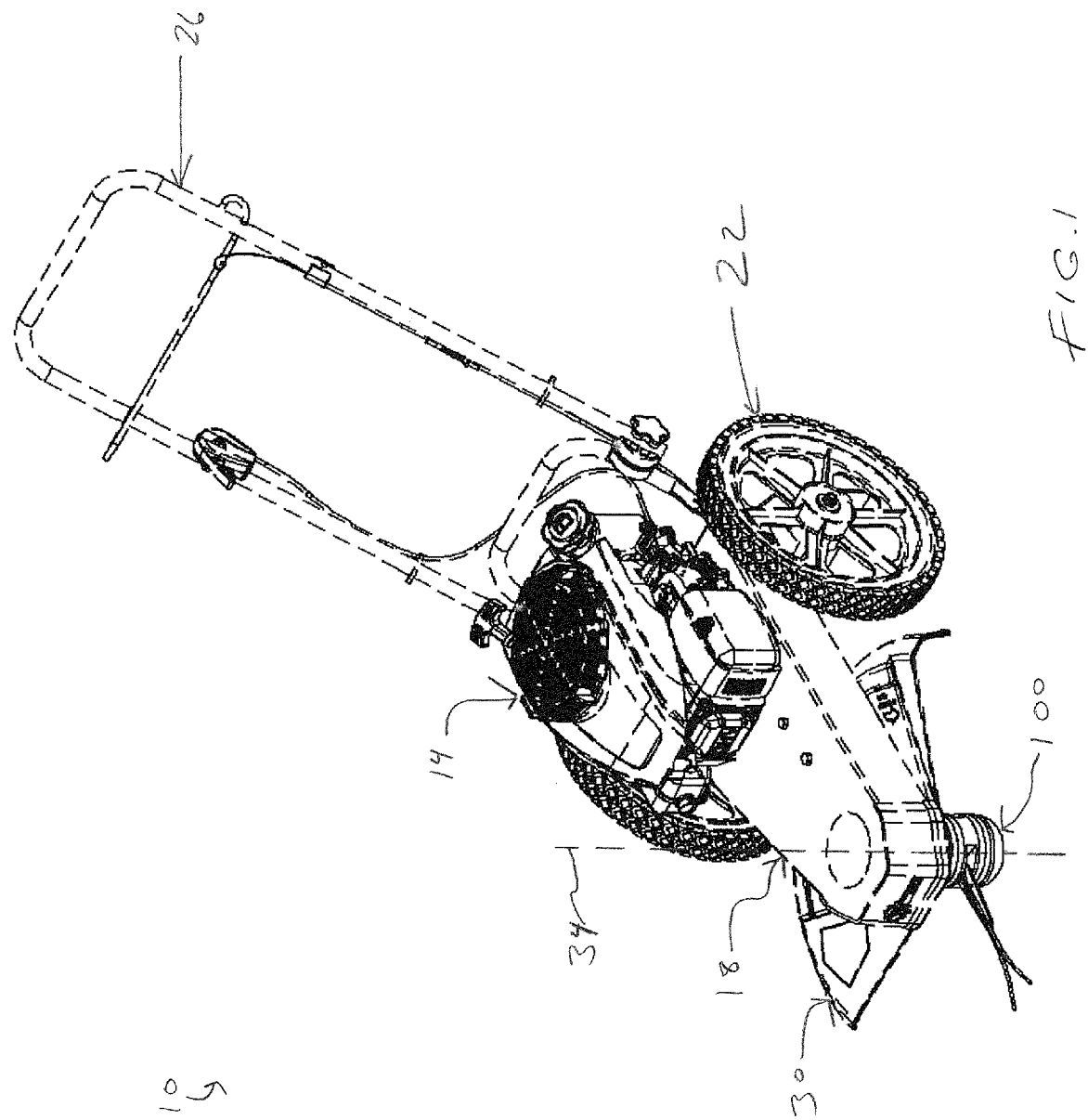

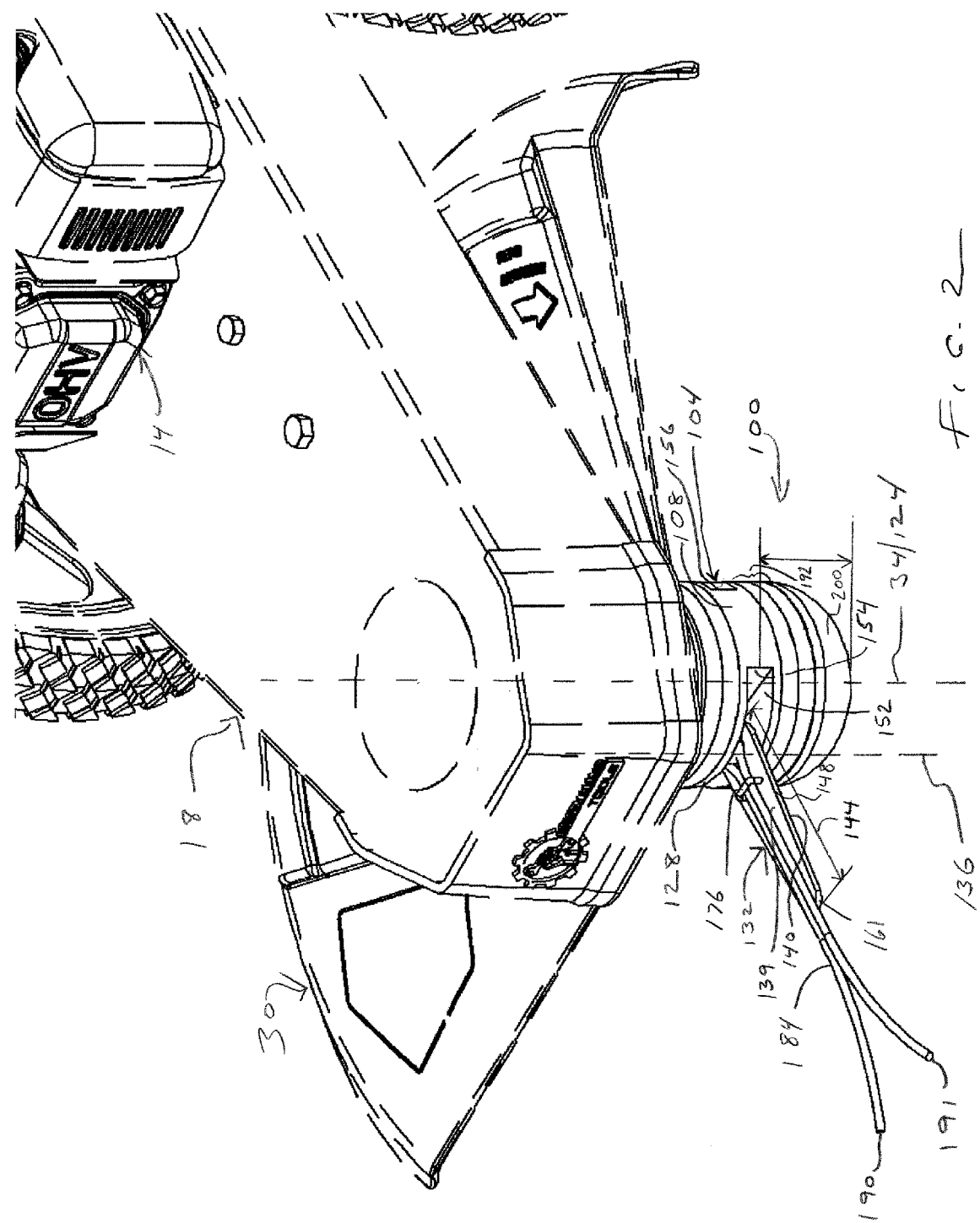

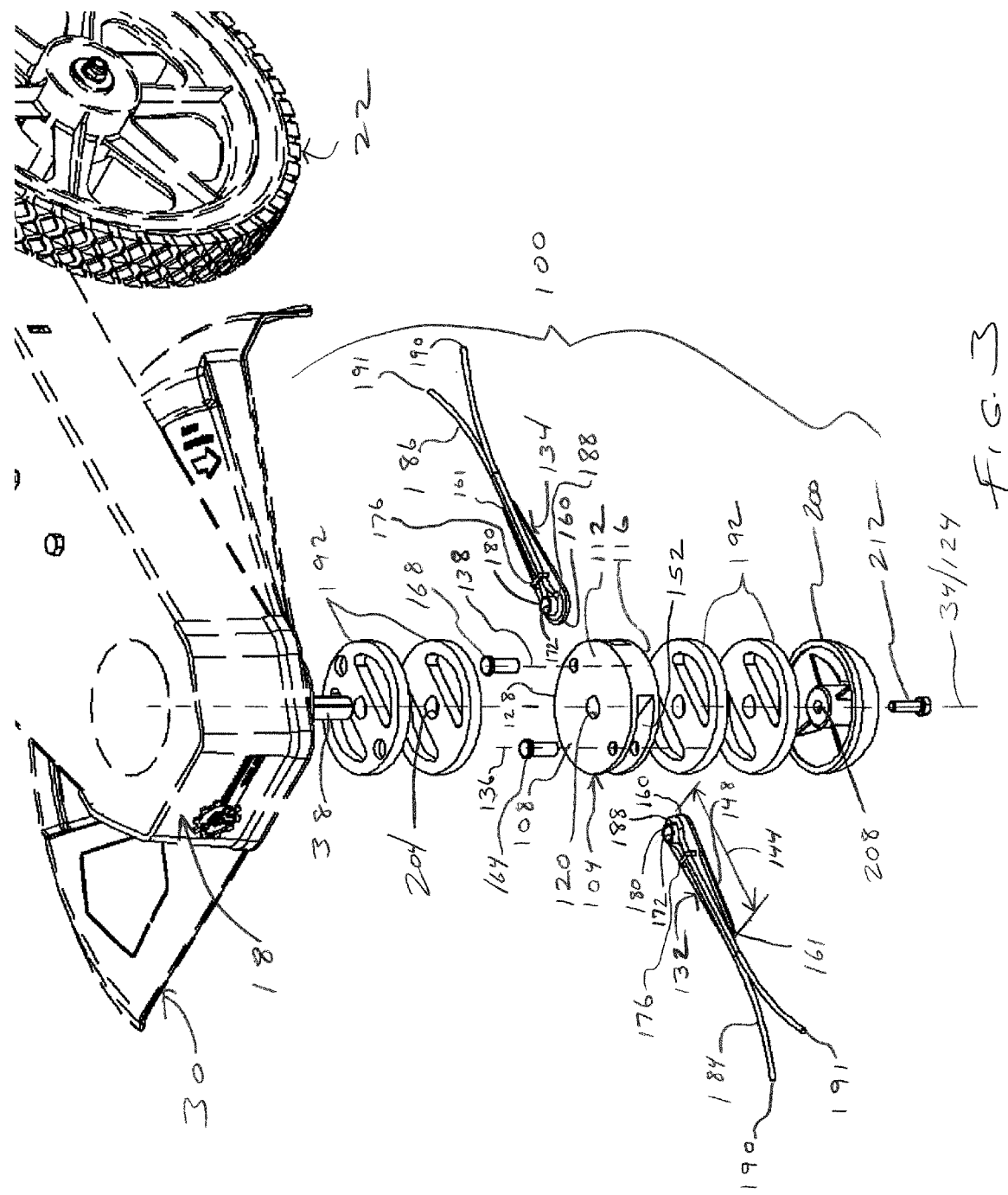

INTEGRATED STRING AND BLADE TRIMMER SYSTEM

CROSS REFERENCE TO RELATED APPLICATION

This application claims priority from U.S. Ser. No. 61/893,665, entitled "INTEGRATED STRING AND BLADE TRIMMER SYSTEM," and filed on Oct. 21, 2013, the entire contents of which are incorporated by reference herein as if set forth in full.

FIELD

The present invention relates to cutting devices and, more particularly, to cutting heads for cutting devices such as string trimmers.

BACKGROUND

String trimmers (e.g., hand held trimmers, two-wheeled trimmers, four-wheeled trimmers, mowers, etc.) have been used for cutting vegetation with lines that are secured to a rotating head driven by an engine or motor. Typically, such string trimmers have been used for cutting the areas of vegetation that are inaccessible to mowers having steel blades. For example, vegetation along an edge of a walkway or fence is usually cut very close to the ground.

However, string trimmers have more recently gained acceptance in the cutting of vegetation (e.g., grass, etc.) in a wider variety of situations. For instance, string trimmers have been used as lawn mowers to cut grass at a desired length above the ground (e.g., two to four inches) to provide a cut having a neat appearance. Still further, string trimmers have also found wide use in the cutting of field-type growth that is cut rather infrequently and that is left at increased heights.

SUMMARY

Disclosed herein is an integrated string and trimmer blade system or head that allows a user to simultaneously employ one or more flexible lines and one or more blades during various types of cutting operations (e.g., for cutting or trimming grass, weeds, branches, etc.). The disclosed head may be implemented on any appropriate cutting apparatuses such as walk-behind trimmers and/or mowers, hand-held trimmers, and/or the like. Broadly, the head includes a cutting member having a body that is rotatable about a pivot axis of a cutting apparatus. The cutting member also includes one or more cutting blades pivotally attached or attachable to the body such that the blades can oscillate or otherwise pivot relative to the body as the body rotates about the pivot axis. At least one of the blades includes one or more line holders thereon for receipt and/or attachment of one or more flexible cutting lines or strings. Allowing for pivotal movement of the blades (and thus the flexible lines) relative to the body as the body rotates about the pivot axis advantageously allows for forward and/or backward oscillation of the blades and flexible lines when the blades and/or flexible lines strike objects (e.g., rocks, thick branches, etc.) to limit breakage of the blades and flexible lines (e.g., as well as limiting unintended removal of the flexible lines from the line holders of the blades). In one arrangement, a height of a cutting plane of the cutting member may be adjusted by appropriately configuring and/or positioning one or more spacer plates of the cutting system.

Any of the embodiments, arrangements, and the like discussed herein may be used (either alone or in combination with other embodiments, arrangement, and the like) with any of the disclosed aspects. Any feature disclosed herein that is intended to be limited to a "singular" context or the like will be clearly set forth herein by terms such as "only," "single," "limited to," or the like. Merely introducing a feature in accordance with commonly accepted antecedent basis practice does not limit the corresponding feature to the specific words or phrases used. Moreover, any failure to use phrases such as "at least one" also does not limit the corresponding feature to the singular. Use of the phrase "generally," "at least generally," "substantially," "at least substantially" or the like in relation to a particular feature encompasses the corresponding characteristic and insubstantial variations thereof. Finally, a reference of a feature in conjunction with the phrase "in one embodiment" or the like does not limit the use of the feature to a single embodiment.

Reference will now be made to the following drawings, which assist in illustrating the various pertinent features of the various novel aspects of the present disclosure.

BRIEF DESCRIPTION OF THE DRAWINGS

FIG. 1 is a perspective view of a cutting apparatus that may utilize the cutting head disclosed herein for cutting grass, brush, branches, and/or the like.

FIG. 2 is a close-up perspective view of the cutting head disclosed herein.

FIG. 3 is an exploded perspective view of the cutting head of FIG. 2.

DETAILED DESCRIPTION

FIG. 1 is a perspective view of a cutting apparatus 10 that may utilize a cutting system or head 100 as disclosed herein for cutting a wide variety of vegetation such as grass, brush, branches, and the like. For instance, the cutting apparatus 10 may include an engine 14 mounted on frame 18 which may be appropriately guided over the ground by a pair of wheels 22 and a handle 26 connected to the frame 18. The engine 14 may be appropriately configured (e.g., via chains, linkages, etc., not shown) to drive a drive or pivot shaft 38 (shown in FIG. 3) about a pivot or rotation axis 34 (e.g., in first and/or second rotational directions) to induce corresponding rotation of the cutting head 100 about the rotation axis 34 at any appropriate rotational speed. Any appropriate guard 30 may be secured to the frame 18 to shield operators from flying debris owing to rotation of the cutting head 100. While the cutting head 100 is shown mounted on a cutting apparatus 10 in the form of a two-wheeled walk-behind trimmer/mower, the cutting head 100 may also be rotatably mounted on other types of cutting apparatuses 10 such as three or four-wheeled trimmers or mowers, hand-held trimmers free of any wheels, electric and/or gas-powered devices, and/or the like.

With reference now to FIGS. 2-3, the cutting head 100 may include a cutting member 104 that is configured to cut and/or otherwise sever a wide variety of vegetation of varying dimensions in a manner that reduces wear and tear on the cutting head 100 in relation to existing cutting heads. Broadly, the cutting member 104 includes a body 108 including opposed upper (e.g., first) and lower (e.g., second) surfaces 112, 116, an aperture 120 extending through and between the upper and lower surfaces 112, 116, an axis 124 extending through the aperture 120 and configured to be collinear with the rotation axis 34 of the pivot shaft 38, and a peripheral edge 128 extending about the axis 124. For instance, the aperture 120 may be a central aperture 120 that is disposed through a substantial center point of the upper and lower surfaces 112, 116 and surrounded by the peripheral edge 128. The aperture 120 may be sized and shaped to receive the pivot shaft 38 in a manner that so that the cutting member 104 is non-rotatable relative to the pivot shaft 38 (i.e., so that rotation of the pivot shaft 38 induces corresponding rotation of the cutting member 104 about the axes 34, 124). For instance, the pivot shaft 38 and aperture 120 may have any appropriate non-circular cross-sections (e.g., hexagonal, square, etc.).

The cutting member 104 includes at least one blade such as first and second blades 132, 134 (e.g., constructed of metals, plastics, composites, etc.) that may be pivotally mounted to the body 108 about respective first and second pivot or rotation axes 136, 138 (each of which is parallel to the axes 34, 124) to define a cutting plane (not labeled) through the body 108 of the cutting member 104, where the cutting plane is perpendicular to the rotation axis 34. Each of the first and second blades 132, 134 may include opposed upper and lower surfaces 139, 140 (labeled in FIG. 2) and a peripheral edge 148 that is configured to sever vegetation and the like. For instance, the peripheral edge 148 may be sharpened in any appropriate manner to allow the peripheral edge to sever vegetation during typical rotational speeds of the pivot shaft 38.

The body 108 and/or first and second blades 132, 134 may be configured so that at least a majority of a length 144 of each of the first and second blades 132, 134 extends past the outer periphery 128 of the body 108. Stated differently, the cutting member 104 may be designed so that most of the length 144 of the first and second blades 132, 134 is outside of the outer periphery 128 of the body 108. This arrangement advantageously makes a large portion of the peripheral edges 148 of the first and second blades 132 available to sever vegetation and the like as the first and second blades 132, 134 swing (e.g., oscillate) about the first and second rotation axes 136, 138 under centrifugal force generated during rotation of the cutting head 104 about axes 34, 124.

The first and second blades 132, 134 may be respectively pivotally mounted to the body 108 about the first and second rotation axes 136, 138 in any appropriate manner. In one arrangement, the body 108 may include first and second cavities 152, 156 between the upper and lower surfaces 112, 116 that are respectively configured to receive a first end 160 of the first and second blades 132, 134. For instance, the first ends 160 of the first and second blades 132, 134 may be respectively inserted into the first and second cavities 152, 156. Respective pivot pins 164, 168 may then be inserted through aligned apertures (not labeled) in the upper and lower surfaces 112, 116 of the body 108 and apertures 172 in the first ends 160 of the first and second blades 132, 134 to allow for rotation of the first and second blades 132, 134 about the first and second rotation axes 136, 138. See FIG. 3. Inserting the shaft 38 through the aperture 120 of the body 108 and then securing a mowball 200 or the like over an end of the pivot shaft 38 (e.g., via fastener 212) secures the pivot pins 164, 168 within the aligned apertures in the upper and lower surfaces 112, 116 of the body 108 and the apertures 172 in the first ends 160 of the first and second blades 132, 134 (e.g., via sandwiching or compressing the heads of the pivot pins 164, 168 between the upper surface 112 of the body 108 and a lower surface of a spacer plate 192 or a lower surface of the cutting apparatus 10).

In one arrangement, each of the first and second blades 132, 134 may be respectively pivotal or rotatable about the first and second rotation axes 136, 138 by about 180° (e.g., as generally defined by a rear wall 154 of the first cavity 152 (labeled in FIG. 2) and a similar rear wall (not shown) of the second cavity 156). However, other rotation ranges of the first and second blades 132, 134 are also envisioned and encompassed in the present disclosure. Furthermore, other manners of pivotally attaching the first and second blades 132, 134 to the body 108 are also envisioned and encompassed herein. For instance, one embodiment includes pivotally securing the first ends 160 of the first and second blades 132, 134 over and onto the upper surface 112 of the body 108 (e.g., rather than within the first and second cavities 152, 156) with any appropriate fasteners, nuts, and/or the like.

One or both of the first and second blades 132, 134 may include a line holding arrangement for holding and securing a length of flexible line (e.g., nylon string or the like) thereto to sever vegetation and the like during rotation of the cutting head 104 about axes 34, 124 (and thus during swinging movement of the first and second blades 132, 134 about the first and second rotation axes 136, 138). For instance, each of the first and second blades 132, 134 may include at least one line holder in the form of a rigid loop 176 (e.g., tie-down, ring, hole, etc.) in or extending from one of the upper and lower surfaces 139, 140 thereof. Additionally, each of the first and second blades 132, 134 may include a line holder in the form of a projection or post 180 spaced from the loop 176 and extending from one of the upper and lower surfaces 139, 140 thereof, such as along the respective first and second rotation axes 136, 138 about the apertures 172.

In one embodiment when the first and second blades 132, 134 are disconnected from the body 108 as in FIG. 3, a loop 188 of each of first and second lengths of flexible line 184, 186 may be respectively inserted through the loops 176 and placed over posts 180 such that first and second ends 190, 191 of the flexible lines 184, 186 extend away from the loops 176 in a direction opposite from the posts 180. In one arrangement, first and second portions of each of the first and second flexible lines 184, 186 may be appropriately bonded together to facilitate insertion of the loops 188 through the loops 176 and placement over posts 180. Upon insertion of the first ends 160 of the first and second blades 132, 134 into the respective first and second cavities 152, 156 so that the apertures 172 align with the apertures (not labeled) through the upper and lower surfaces 112, 116 of the body 108, the pivot pins 164, 168 may be inserted through the apertures in the upper and lower surfaces 112, 116 of the body 108 and the apertures 172 in the first ends 160 of the first and second blades 132, 134 and thus through the posts 180 to allow for rotation of the first and second blades 132, 134 about the first and second rotation axes 136, 138. See FIGS. 2-3. In one embodiment, the bonding may not extend all the way to the first and second ends 190, 191 of the first and second flexible lines 184, 186 so that each of the first and second ends 190, 191 of each of the first and second flexible lines 184, 186 is free to move relative to the other of the first and second ends 190, 191 during rotation of the cutting member 104.

In another embodiment (e.g., when first and second portions of the flexible lines 184, 186 are not bonded together), one of the first and second ends 190, 191 of the first and second flexible lines 184, 186 may be inserted through the loops 176, wrapped around the posts 180, and then passed back through the loops 176. Thereafter, the first ends 160 of the first and second blades 132, 134 may be inserted into the first and second cavities 152, 156 and then the first and second pivot pins 164, 168 may be inserted through the aligned apertures in the upper and lower surfaces 112, 116 of the body 108 as well as the apertures 172 in the first and second blades 132, 134. See FIG. 2. At this point, the first and second flexible lines 184, 186 may be secured to the body 108 and to the respective first and second blades 132, 134 to rotate therewith.

In another embodiment, the first and second flexible lines 184, 186 may be inserted through and/or around the line holders while the first and second blades 132, 134 are connected to the body 108 (e.g., while the first and second pivot pins 164, 168 are inserted through the body 108 and the ends 160 of the first and second blades 132, 134). For instance, one of the first and second ends 190, 191 of each of the flexible lines 184, 186 may be inserted or fed through the loops 176 of the first and second blades 132, 134 and into the first and second cavities 152, 156 of the body 108 on one side of the posts 160. Thereafter, the flexible lines 184, 186 may be urged into the first and second cavities 152, 156 so that the one of the first and second ends 190, 191 ends deflects against the rear walls 154 of the first and second cavities 152, 156 and eventually exits the first and second cavities 152, 156 on an opposing side of the posts 160. The one of the first and second ends 190, 191 may then be pulled and inserted back through the loops 176. In the event that an operator wants to remove one or both of the flexible lines 184, 186 from the line holders of the first and second blades 132, 134 the operator may, in one embodiment, pull one of the ends of the flexible lines 184, 186 to remove the flexible lines 184, 186 from the line holders of the first and second blades 132, 134.

The flexible lines 184, 186 may be sized such that the first and second ends 190, 191 of the flexible lines 184, 186 extend past second ends 161 of the first and second blades 132, 134 (e.g., where the second ends 161 are generally opposite the first ends 160). See FIGS. 1-3. This arrangement allows the flexible lines 184, 186 to sever thinner vegetation and the like such as grass and weeds which advantageously reduces wear on the first and second blades 132, 134 and thereby increasing their useful lifespan. As just one example, the first and second ends 190, 191 of the flexible lines 184, 186 may extend a distance past the second ends 161 of the first and second blades 132, 134 that is about twice the length 144 of the first and second blades 132, 134. However, the flexible lines 184, 186 may be cut and/or selected to be of any desired length and/or size.

The cutting head 100 may also include one or more spacer plates 192 that may be appropriately disposed along the central axes 34, 124 to adjust a height 196 of the cutting plane of the cutting member 104 relative to a bottom of a mowball 200 (e.g., ground-engaging member, cap, etc.) of the cutting head 100 (e.g., where the height 196 is the distance between the cutting plane and the bottom of the mowball 200). For instance, assume the components of the cutting head 100 were in the positions shown in the exploded view of FIG. 3. Initially, the upper-most spacer plates 192 may be slid onto the pivot shaft 38 (e.g., via inserting the pivot shaft 38 into central apertures 204 of the spacer plates 192). Thereafter, the cutting member 104 may be slid onto the pivot shaft 38 and then the lower-most spacer plates 192 may be slid onto the pivot shaft 38. Finally, the mowball 200 may be slid onto the pivot shaft 38 (or at least a central aperture 208 of the mowball 200 may be aligned with the central axes 34, 124 adjacent a first side of the mowball 200) and then a threaded fastener 212 or the like may be inserted through the central aperture 208 via an opposed second side of the mowball 200 and into a threaded aperture (not shown) within the pivot shaft 38 to secure the mowball 200, spacer plates 192 and cutting member 104 into a unitary stack as shown in FIGS. 1-2.

In the event that an operator determined that the height 196 of the cutting plane needed to be adjusted, the operator may then remove (e.g., unthread) the fastener 212 from the pivot shaft 38, remove the mowball 200, at least one spacer plate 192 and the cutting member 104 from the pivot shaft 38, appropriately rearrange the at least one spacer plate 192 and cutting member 104 on the pivot shaft, and then reinstall the mowball 200 and fastener 212 so that the height 196 of the cutting plane is of a second distance different than a first distance before the rearrangement. For instance, assume that the operator wanted to decrease the height 196 of the cutting plane of the cutting member 104 by the amount of one spacer plate 192 as shown in FIGS. 1-3. In this regard, the rearranging would involve disposing one of the lower-most spacer plates 192 above the cutting member 104 such that three spacer plates 192 would be disposed above the cutting member 104 and only one spacer plate 192 would be disposed below the cutting member 104 thus reducing the height 196 of the cutting plane of the cutting member 104. Of course, more spacer plates 192 could be disposed below the cutting member 104 to increase the height 196 of the cutting plane of the cutting member 104.

While four spacer plates 192 have been illustrated, more or fewer spacer plates are also envisioned and included within the scope of the present disclosure. In some embodiments, one or more spacer plates 192 may be completely removed from the cutting head 100 to adjust the height 196 of the cutting plane relative to the bottom of the mowball 200. For instance, removing the mowball 200 and at least one of the lowermost spacer plates 192 in FIG. 3 and then reinstalling the mowball 200 and tightening the fastener 212 would decrease the height 196. In another embodiment, one or more spacer plates 192 may be added to increase the height 196 (e.g., so that there are three or more spacer plates 192 between the mowball 200 and the cutting member 104). Furthermore, while the pivot shaft 38 and threaded fastener 212 have been discussed as one manner of securing together the various components of the cutting head 100, various other arrangements are also envisioned and included. In the event that a lower outer portion of the pivot shaft 38 was threaded, for instance, the fastener 212 may be in the form of a threaded nut configured to thread over the outer surface of the pivot shaft 38.

The disclosed cutting head 100 advantageously allows a user to simultaneously employ one or more flexible lines and one or more blades during various types of cutting operations (e.g., for cutting or trimming of grass, weeds, branches, etc.). Furthermore, allowing for pivotal movement of the blades (and thus the flexible lines) relative to the body (e.g., about rotation axes 136, 138) as the body is rotating about central axes 34, 124 advantageously allows for forward and/or backward oscillation of the blades and flexible lines when the blades and/or flexible lines strike objects (e.g., rocks, thick branches, etc.) to limit breakage of the blades and flexible lines (e.g., as well as unintended removal of the flexible lines from the line holders of the blades). Still further, the height 196 of the cutting plane may be efficiently adjusted as disclosed herein. In one arrangement, the cutting head 100 may be included on new cutting apparatuses 10 supplied to wholesalers, retailers, end customers, etc. In other arrangements, the cutting head 100 may be included as part of an aftermarket kit (e.g., including the cutting member 104, one or more spacer plates 192, one or more flexible lines, etc.) for installation onto an existing cutting apparatus.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the disclosure herein. For instance, while first and second blades 132, 134 that pivot about respective pivot axes 136, 138 that are separated by about 180° about the axes 34, 124 have been shown and described herein, the cutting head may include more or fewer than two blades.

As another example, more than one rigid loop (or other securement feature) may extend from or otherwise be disposed on the surface (e.g., upper surface 139) of each of the blades for securing or holding flexible lines thereto. For instance, a second rigid loop 176 may be disposed adjacent the second end 161 of each of the first and second blades 132, 134. The embodiments described hereinabove are further intended to explain best modes known of practicing the invention and to enable others skilled in the art to utilize the invention in such, or other embodiments and with various modifications required by the particular application(s) or use(s) of the invention. It is intended that the appended claims be construed to include alternative embodiments to the extent permitted by the prior art.

What is claimed is:

1. A cutting member for rotation on a cutting apparatus, comprising:
    a body including opposed upper and lower surfaces, a peripheral edge, and a rotation axis about which the body is configured to rotate;
    at least a first blade pivotally mounted to the body about a first pivot axis that is parallel to the rotation axis, wherein the first blade includes:
        at least one line holder extending away from a surface of the first blade, wherein a majority of a length of the first blade extends past the peripheral edge of the body; and
        a post extending from the surface of the first blade, wherein the post is spaced from the line holder, and wherein the first pivot axis extends through the post; and
    at least one first flexible line that extends through the line holder, around the post, and then back through the line holder, wherein first and second ends of the first flexible line extend away from the line holder in a direction opposite from the post.

2. The cutting member of claim 1, wherein the body includes at least a first mounting cavity between the upper and lower surfaces, wherein an end of the first blade is pivotally mounted to the body about the first pivot axis within the first mounting cavity.

3. The cutting member of claim 2, further comprising:
    at least a first pivot pin disposed through the upper and lower surfaces of the body and the end of the first blade along the first pivot axis to pivotally secure the first blade to the body.

4. The cutting member of claim 3, wherein the first pivot pin extends through the post.

5. The cutting member of claim 1, wherein the line holder is a rigid loop extending from a surface of the first blade.

6. The cutting member of claim 1, wherein the first blade is pivotable about the first pivot axis over 180°.

7. The cutting member of claim 1, further comprising:
    at least a second blade pivotally mounted to the body about a second pivot axis that is parallel to the rotation axis, wherein the second blade includes at least one line holder, and wherein a majority of a length of the second blade is configured to extend past the peripheral edge of the body.

8. The cutting member of claim 7, wherein the first and second pivot axes are separated by about 180° about the rotation axis.

9. A system, including:
    a shaft;
    the cutting member of claim 1 disposed on the shaft for rotation about the central axis.

10. The system of claim 9, further comprising:
    at least one spacer plate disposed on the shaft adjacent the cutting member.

11. The system of claim 9, further comprising:
    a mowball disposed on the shaft, wherein the mowball limits removal of the cutting member from the shaft.

12. A cutting apparatus, comprising:
    a motor; and
    the system of claim 9, wherein the shaft is connected to the motor, and wherein operation of the motor rotates the shaft and cutting member about the central axis.

13. A kit, comprising:
    the cutting member of claim 1; and
    one or more spacer plates, wherein each of the one or more spacer plates includes a central rotation axis configured to be collinear with the central rotation axis of the cutting member.

14. The kit of claim 13, further comprising:
    a plurality of cutting lines.

15. The cutting member of claim 1, further comprising:
    at least a first pivot pin disposed through the body and an end of the first blade along the first pivot axis to pivotally secure the first blade to the body.

16. The cutting member of claim 15, wherein the first pivot pin extends through the post.

17. The cutting member of claim 1, wherein the line holder is disposed outside of the peripheral edge.

18. A cutting member for rotation on a cutting apparatus, comprising:
    a body including opposed upper and lower surfaces, a peripheral edge, and a rotation axis about which the body is configured to rotate; and
    at least a first blade pivotally mounted to the body about a first pivot axis that is parallel to the rotation axis, wherein the first blade includes:
        at least one line holder forming a loop disposed on an external surface of the blade, wherein a majority of a length of the first blade extends past the peripheral edge of the body; and
        a post extending from a surface of the first blade, wherein the post comprises an aperture along the first pivot axis and is spaced longitudinally along the blade in a direction toward the rotation axis from the line holder such that no portion of a first flexible line disposed between the peripheral edge and the rotation axis is disposed within the loop;
    wherein the first flexible line extends through the line holder, around the post, and then back through the line holder, and first and second ends of the first flexible line extend away from the line holder in a direction opposite from the post.

19. A cutting member for rotation on a cutting apparatus, comprising:

a body including opposed upper and lower surfaces, a peripheral edge, and a rotation axis about which the body is configured to rotate; and at least a first blade pivotally mounted to the body about a first pivot axis that is parallel to the rotation axis, wherein the first blade includes:

a first surface substantially perpendicular to the rotation axis and defined between a cutting edge of the blade and a trailing edge of the blade opposite the cutting edge;

a second surface opposite the first surface, wherein a cutting plane is parallel to the first and second surfaces and disposed between the first and second surfaces, and wherein a distance between the first and second surfaces is greater at the trailing edge than a distance between the first and second surfaces at the cutting edge;

at least one line holder extending from the first surface in a direction away from the cutting plane, wherein no portion of the line holder passes through the cutting plane, and wherein a majority of a length of the first blade extends past the peripheral edge of the body;

a post extending from the first surface in a direction away from the cutting plane, wherein no portion of the post passes through the cutting plane, wherein the post is spaced from the line holder, and wherein the first pivot axis extends through the post; and at least one first flexible line that extends through the line holder, around the post, and then back through the line holder, wherein first and second ends of the first flexible line extend away from the line holder in a direction opposite from the post and no portion of the first flexible line passes through the cutting plane.

20. A cutting member for rotation on a cutting apparatus, comprising:

a body including opposed upper and lower surfaces, a peripheral edge, and a rotation axis about which the body is configured to rotate;

at least a first blade pivotally mounted to the body about a first pivot axis that is parallel to the rotation axis, wherein the first blade includes:

at least one line holder extending away from an external surface of the first blade, wherein a majority of a length of the first blade extends past the peripheral edge of the body; and a post extending outwardly from the surface of the first blade, wherein the post is spaced from the line holder, and wherein the first pivot axis extends through the post; and at least one first flexible line that extends through the line holder, around the post such that the post holds the line on the blade, and then back through the line holder, wherein first and second ends of the first flexible line extend away from the line holder in a direction opposite from the post.

* * * * *